United States Patent [19]
Cormier

[11] Patent Number: 5,218,201
[45] Date of Patent: Jun. 8, 1993

[54] METHOD AND APPARATUS FOR LINEARIZING PHOTORESISTIVE OPTICAL SENSORS WITH SENSITIVITY-SELECTIVE MASKING

[75] Inventor: Kenneth C. Cormier, Billerica, Mass.

[73] Assignee: Detector Electronics Corporation, Minneapolis, Minn.

[21] Appl. No.: 696,810

[22] Filed: May 7, 1991

[51] Int. Cl.$^5$ .............................................. H01J 3/14
[52] U.S. Cl. ................................ 250/237 R; 250/239; 356/225
[58] Field of Search .................. 250/216, 237 R, 239, 250/211 R; 356/225

[56] References Cited

U.S. PATENT DOCUMENTS

| | | | |
|---|---|---|---|
| 2,143,500 | 1/1939 | Smethurst et al. | 356/225 |
| 2,150,047 | 3/1939 | Bernhard et al. | 356/225 |
| 3,304,435 | 2/1967 | Norwood | 356/225 |
| 3,370,557 | 1/1983 | Axmark et al. | 250/554 |
| 3,476,945 | 11/1969 | Golden et al. | 250/554 |
| 3,478,663 | 11/1969 | Tsuruoka et al. | 356/225 |
| 4,410,266 | 10/1983 | Seider | 356/45 |
| 4,701,624 | 10/1987 | Kern et al. | 250/554 |

Primary Examiner—David C. Nelms
Attorney, Agent, or Firm—Palmatier, Sjoquist & Helget

[57] ABSTRACT

The linearity of a photoresistive device at varying levels of radiant signal is improved by masking the sensitive area of the photoresistive device so that only a portion of the sensitive area is illuminated. The masking prevents exposure of the entire surface area of the cell, which increases the dynamic range, allowing a more linear, small signal sensitivity over wide variations in brightness.

9 Claims, 2 Drawing Sheets

METHOD AND APPARATUS FOR LINEARIZING PHOTORESISTIVE OPTICAL SENSORS WITH SENSITIVITY-SELECTIVE MASKING

BACKGROUND OF THE INVENTION

1. Field of the Invention

The field of the invention is optical sensors and in particular, optical sensors suitable for use in detecting a fluctuating radiant signal in flame monitoring and similar apparatus.

2. Background Art

Optical sensors are frequently used in control systems for large boilers and furnaces to detect the presence of a flame and to provide information about the flame characteristics by measuring the radiant signal produced by the flame. Such information is used by the control system to regulate safe operation of the burner.

The constant component or average amplitude of the radiant signal, measured by the optical sensor, provides a first indication of the presence or absence of the flame. However, the average amplitude may vary considerably dependent on variables such as damper position, proximity of the flame to the sensor, the type of fuel, and the BTU content of the fuel. Further, in multiple flame systems, the radiant background can confuse systems sensitive only to average amplitude, as to the presence and state of the flame.

More sophisticated flame monitoring systems measure the amplitudes of particular frequency components of the radiant signal to provide additional information about the flame and a more accurate appraisal of flame condition. Ideally, the optical sensors used with such systems are equally sensitive to fluctuations in radiant energy regardless of the level of the radiant background, that is, the optical sensors are linear.

Optical sensors used in systems which measure the short term fluctuations in the radiant signal are typically photoresistive devices such as those using lead sulfide or other known photoresistive materials. Such photoresistive devices are relatively inexpensive and rugged and preferred over semiconductor or thermopile-type sensors which do not have sufficient sensitivity in the infrared range. Unfortunately, such photoresistive device are also non-linear in the range of illumination required for use in flame monitoring applications. Specifically, they exhibit a decreased sensitivity t fluctuations in the radiant signal as the average amplitude of the radiant signal increases.

Although methods exist for correcting for such non-linearities with compensation circuits, such methods are relatively expensive and in their complexity may reduce the reliability of the flame monitoring system. These methods also result in a reduction of signal-to-noise ratio in the ultimately produced signal.

SUMMARY OF THE INVENTION

The present invention provides a simple method for increasing the dynamic range and, therefore, the linearity of a photoresistive device. Specifically, an orifice is fit over the photosensitive area of the photoresistive device to mask radiant energy from striking the entire photosensitive area. This masking has the effect of reducing the sensitivity of the device at small levels of brightness, but in return it allows the sensitivity at high brightness levels to be increased.

It is thus one object of the invention to provide a simple method of improving the linearity of photoresistive devices. The orifice may be readily formed out of an opaque material and sized to the external housing of a commercially available photoresistive device, or an opaque and nonconductive mask may be applied directly onto the photoconductive area.

The mask is placed adjacent to the photosensitive area, and thus unlike optical sensors using "f-stop" type apertures, the flux density of the illuminated portion of the photosensitive area is not substantially affected.

It is thus another object of the invention to improve the dynamic range of a photoresistive device without decreasing the level of radiation intensity, or flux density, on the exposed area of the photosensitive device. Preserving the full intensity of the flux on a portion of the photosensitive area avoids the degradation in AC sensitivity implicit in an f-stop type system. In an f-stop type system, the intensity of the radiation signal, including variations in intensity which produce the AC signal, is decreased uniformly over the photosensitive surface.

The foregoing and other objects and advantages of the invention will appear from the following description. In the description, reference is made to the accompanying drawings which form a part hereof and in which there is shown, by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

Figure 1:
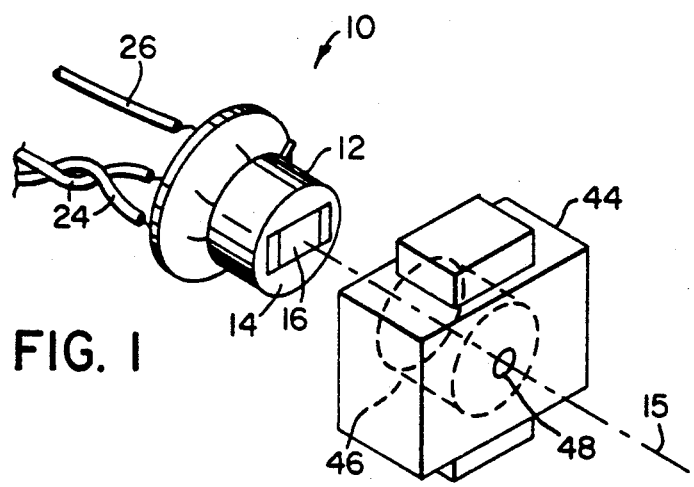
FIG. 1 is an exploded perspective view of the optical sensor assembly showing the photoresistor fitted to the mask of the present invention and showing the axis of sensitivity.
Figure 2:
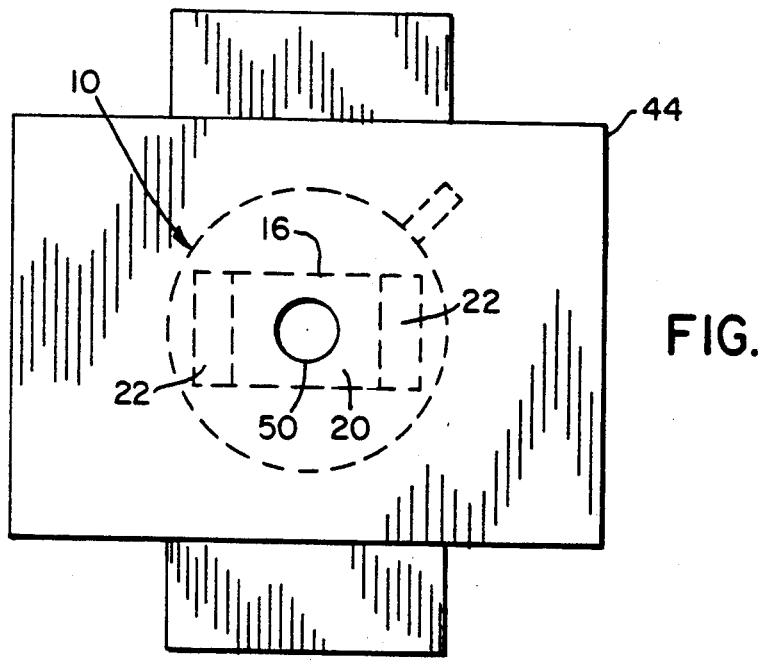
FIG. 2 is a view in elevation of the optical sensor assembly of FIG. 1 looking along the axis of sensitivity and showing the exposed portion of the photosensitive are of the photoresistor.

Referring to FIGS. 1 and 2, a photoresistor 10 includes a cylindrical metal housing 12 having a window 14 at one end, the window 14 being transparent to a radiant signal along an axis of sensitivity 15 from a flame (not shown) or the like. The window 14 exposes a photoresistive cell 16 having a centrally positioned rectangular photosensitive area 20 for receiving the radiant energy through the window 14. The photosensitive area 20 is flanked by contact surfaces 22 which are connected to leads 24 for measuring the resistance between the contact areas 22 and hence across the photoresistive cell 16. A third lead 26 connects to the cylindrical metal housing 12 to provide a means of electrically shielding the photosensitive cell 16 as will be understood to those of ordinary skill in the art.

The photoresistor 10 is representative of commercially available devices and employs in the photoresistive cell 16 a material exhibiting pronounced photoconductive effects, typically lead sulfide, PbS. Other such photoconductive materials, such as PbSe, CdS, CdSe, CdTe may also be used.

Figure 3:
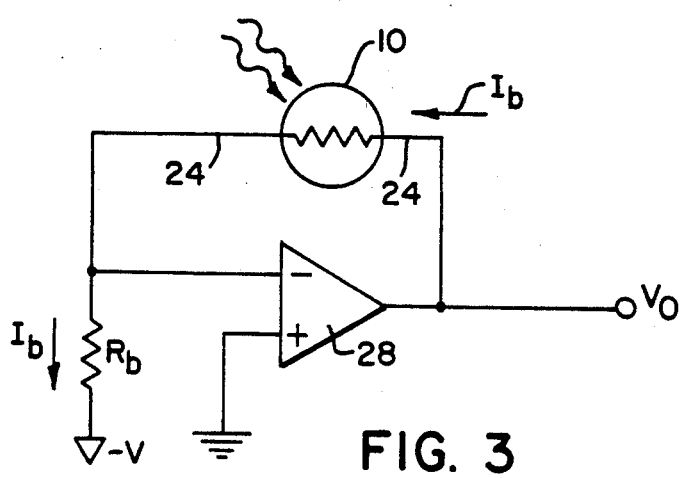
FIG. 3 is a schematic representation of a detection circuit for using the photoresistor of the present invention in a constant current mode.

Referring to FIG. 3, the resistance of the photoresistor 10 is measured by an operational amplifier 28 configured to bias the photoresistor 10 with a constant current $I_b$. The non-inverting input of the operational amplifier 28 is connected to a ground reference voltage. The inverting input of the operational amplifier is connected to one lead 24 of the photoresistor 10 and the other lead 24 of the photoresistor 10 is connected to the output of the operational amplifier 28. A biasing resistor $R_b$ is connected between the inverting input of the operational amplifier 28 and a negative voltage source $-V$.

Under constant current biasing, the voltage $V_o$ across the photoresistor 10 and at the output of the operational amplifier 28 will be proportional to the resistance of the photoresistor 10. Specifically, the resistance of the photoresistor 10 will be equal to $V_o/I_b$. This biasing current $I_b$ is fixed by the value of the biasing resistor $R_b$ and the negative voltage source $-V$. Thus, the resistance of the photoresistor 10 will be proportional to $V_o$.

Figure 4:
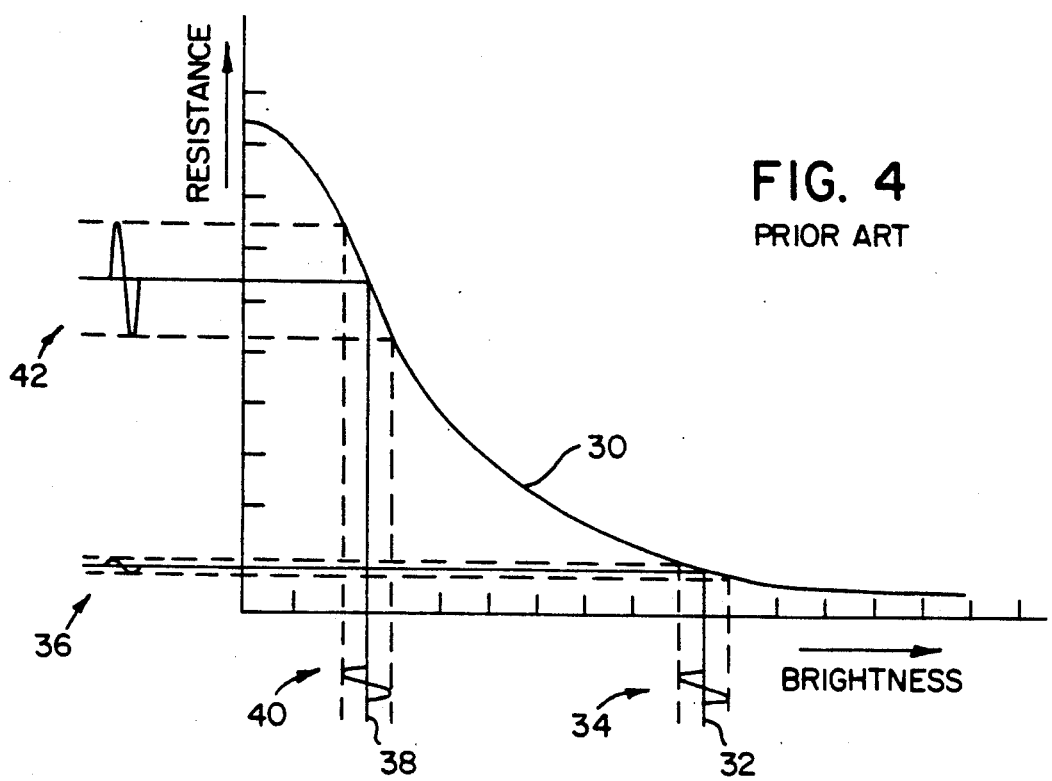
FIG. 4 is a graph of resistance vs. radiation for the photoresistor of FIG. 1, without the mask of the present invention, showing the variation in AC sensitivity caused by the non-linear response of the photoresistor which results from its narrow dynamic range.

The resistance of the photoresistor 10 is dependant upon the radiant signal received by the photosensitive area 20 and the contact areas 22, and as discussed above, may be deduced from the voltage $V_o$ at the output of the operational amplifier 28. Referring to FIG. 4, a response curve 30 of photoresistor 10 indicates the resistance of the photoresistor 10 as a function of the strength or brightness of a radiant signal.

The response curve 30 is generally non-linear over the range of interest for flame monitoring, that is, its slope changes as a function of the brightness of the radiant signal. As a result of this non-linearity, the change in resistance by the photoresistor 10 for small fluctuations in radiant signal is dependant on the average level of brightness about which those fluctuations occur.

Borrowing from the terminology of the electronics, the average value of the brightness of the radiant signal will be termed the DC component of the radiant signal and the deviation of the brightness of the radiant signal about that average value will be termed the AC component of the radiant signal. It follows that the DC sensitivity of the photoresistor 10 is indicated by the value of the response curve 30 and the AC sensitivity of the photoresistor 10 is given by the slope of the response curve 30 at that value.

For example, for a radiant signal with a high DC component shown by line 32, the value of the resistance of the photoresistor 10 is low and the slope of the response curve 30 for that value is low. Accordingly, for a given AC fluctuation 34 of the radiant signal about line 32, the fluctuation of resistance 36 of the photoresistor 10 will be small. Conversely, for a radiant signal with a low DC component shown by line 38, the value of the resistance of the photoresistor 10 cell is high and the slope of the response curve 30 for that value is high. Accordingly, for a given AC fluctuation 40 of the radiant signal about line 38, the fluctuation of resistance 42 of the photoresistor 10 will be large.

As a practical matter, this non-linearity of the response curve 30 means that the AC sensitivity of the photoresistor 10 is severely degraded for radiant signals with high DC components. Such signals are typical of gas flames that are semi-transparent where extraneous DC components such as radiation from refractories or "fireballs" tend to show through. This loss of sensitivity complicates the reliable measurements of the AC components of the radiant signal under differing environmental conditions, such as is necessary for reliable flame monitoring.

Referring again to FIGS. 1 and 2, a mask 44 constructed of opaque plastic has a cylindrical blind bore 46 receiving the cylindrical metal housing 12 of the photoresistor 10. The closed face of the bore 46 has a cylindrical orifice 48 for transmitting the radiant signal along the axis of sensitivity 15 when the photoresistor 10 is thus in place within the mask 44. Preferably, the orifice 48 is centered within the closed face of the bore 46 so that when the cylindrical metal housing 12 of the photoresistor 10 is positioned within the bore 46, the radiant signal received along the axis of sensitivity 15 strikes the photosensitive area 20 of the photoresistive cell 16 in a zone 50 near the center of the photosensitive area 20 and, not near the edges of the photosensitive area 20 or near the contact areas 22. Nevertheless, it is critical only that there be surrounding portions of photosensitive area 20 that are not exposed to the radiant signal. Although the applicant does not wish to be bound to a particular theory, it is thought that the electrons in the masked-off portion of photosensitive area 20 outside of zone 50, contribute to the photo-conduction so as to improve the operating characteristic of zone 50 of the photosensitive area 20. For a photosensitive area 20 measuring 0.15 inches square, an orifice 48 of 0.1 inches in diameter has been found acceptable. The ratio of masked area of the photosensitive area 20 to non-masked zone 50 of the photosensitive area 20 controls the dynamic range and thus the AC sensitivity of the photoresistive cell 16.

The thickness of the orifice 48 and the positioning of the orifice 48, adjacent to the photosensitive area 20, is such that the field of view of the photoresistor 10 remains substantially unchanged. The thickness of the orifice 48 is measured along the axis of sensitivity 15, and the field of view of the photoresistor 10 is the angular deviation from the axis of sensitivity 15, through which a radiant signal may be received by the photoresistor 10.

Figure 5:
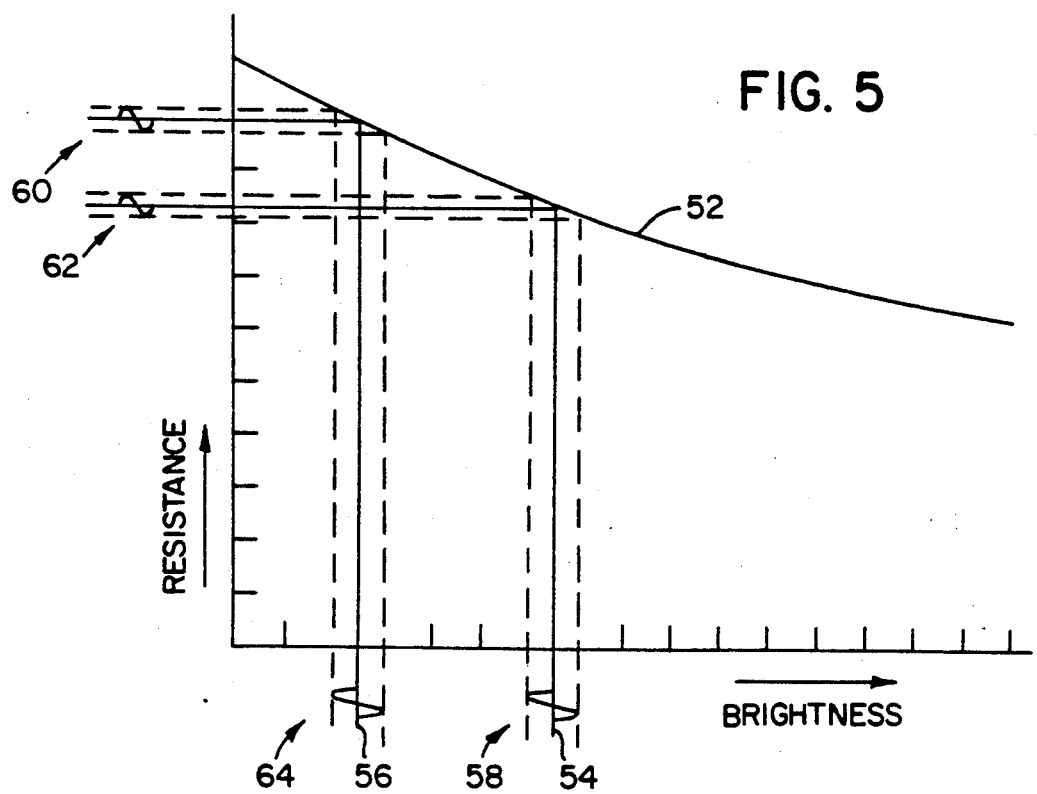
FIG. 5 is a graph similar to that of FIG. 4 but with the mask of the present invention in place to restrict exposure of the photosensitive area of the photoresistor illustrating the more constant AC sensitivity that results from the increased dynamic range.

Referring to FIG. 5, the response curve 52 of the photoresistor 10, assembled with the mask 44 and orifice 48, has a substantially greater dynamic range and is more linear than the response curve 30 of the bare photoresistor 10. This increase in dynamic range is without comparable loss of AC sensitivity. In a system employing an f-stop, any increase in dynamic range would be expected to include a corresponding loss of AC sensitivity.

For example, for a radiant signal with a high DC component, shown by line 54, the value of the resistance of the photoresistor 10 is low, but the slope of the response curve 52 for that value is approximately equal to the slope of the response curve 52 at the value of resistance for a radiant signal with a low DC component, shown by line 56. Accordingly, for a given AC fluctuation 58 of the radiant signal about line 54, the fluctuation of resistance 60 of the photoresistor 10 will have an amplitude comparable to that of the fluctuation of resistance 62, caused by an AC fluctuation 64 of the radiant signal about line 56 and comparable to AC fluctuation 58.

As a result of the decreased area of zone 50, compared to the photosensitive area 20, additional biasing current $I_b$ is used in conjunction with the use of mask 44. The multiplicative factor implicit in this increased biasing current $I_b$ used to generate response curve 52 would be expected, all things being equal, to exacerbate the non-linear features of the response curve 52. Nevertheless, the response curve 52 is in fact more linear than response curve 30 without this increased bias current $I_b$.

The improved linearity of the response curve 52, over response curve 30, improves the ability of the photoresistor 10 to measure fluctuations in the radiant signal from flames and the like under a variety of radiant backgrounds.

Many modifications and variations of the preferred embodiment which will still be within the spirit and scope of the invention will be apparent to those with ordinary skill in the art. For example, the precise shape or placement of the orifice 48 may be modified, provided a suitable portion of the photosensitive area 20 is suitably masked. Also, the separate mask 44 may be replaced with a non-conductive, opaque material affixed directly to the surface of the photosensitive cell 16. Further, multiple orifices 48 may be used in lieu of the single orifice 48, provided portions of the photosensitive area 20 are suitably masked from radiation. In order to apprise the public of the various embodiments that may fall within the scope of the invention, the following claims are made.

I claim:

1. An optical sensor comprising:
   a photoresistor having a photoresistive cell with a photosensitive area for receiving a radiant signal and changing the resistance of the cell in response to the radiant signal; the photosensitive area having edge areas of relatively lower light sensitivity and a center area of relatively higher light sensitivity; and
   a mask for fitting over the photosensitive area for masking the radiant signal from the edge areas of photosensitive area, the mask having an orifice for admitting the radiant signal to the center area.

2. The optical sensor as recited in claim 1 wherein the mask is adjacent to the photosensitive area.

3. The optical sensor as recited in claim 1 wherein the mask comprises an opaque material having a single orifice.

4. The optical sensor as recited in claim 3 wherein the orifice is positioned to allow the radiant signal to strike only the center of the photosensitive area.

5. The optical sensor as recited in claim 1 wherein the photoresistor is contained within a housing and wherein the mask comprises an opaque material having a recess for receiving the housing.

6. The optical sensor of claim 1, wherein the ratio of the photosensitive area to the orifice area is about 1.5:1.

7. The optical sensor of claim 5, wherein the orifice is formed as an aperture through said housing and into said recess.

8. The apparatus of claim 1, further comprising means for connecting said photoresistive cell into an amplifier circuit, said amplifier circuit having an output signal proportional to the resistance of said cell.

9. The apparatus of claim 8, wherein said photoresistive cell is connected into a feedback path in said amplifier circuit.

* * * * *